US009503583B2

(12) United States Patent
Rose et al.

(10) Patent No.: US 9,503,583 B2
(45) **Date of Patent: *Nov. 22, 2016**

(54) PEER-TO-PEER, INTERNET PROTOCOL TELEPHONE SYSTEM WITH PROXY INTERFACE FOR CONFIGURATION DATA

(71) Applicant: VTech Telecommunications Limited, Tai Po, New Territory (HK)

(72) Inventors: Christopher Rose, Surrey (CA); Gerry Knopp, Calgary (CA)

(73) Assignee: VTech Telecommunications Limited, Tai Po (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,208

(22) Filed: Nov. 11, 2015

(65) Prior Publication Data

US 2016/0065746 A1 Mar. 3, 2016

Related U.S. Application Data

(63) Continuation of application No. 14/251,507, filed on Apr. 11, 2014, now Pat. No. 9,270,710, which is a continuation of application No. 12/987,860, filed on Jan. 10, 2011, now Pat. No. 8,711,844.

(51) Int. Cl.

| | |
|---|---|
| ***H04L 12/66*** | (2006.01) |
| ***H04M 7/00*** | (2006.01) |
| ***H04L 29/06*** | (2006.01) |
| ***H04L 29/08*** | (2006.01) |

(52) U.S. Cl.

CPC ............ *H04M 7/0063* (2013.01); *H04L 12/66* (2013.01); *H04L 65/1069* (2013.01); *H04L 67/02* (2013.01); *H04L 67/146* (2013.01); *H04L 67/34* (2013.01); *H04L 67/42* (2013.01)

(58) Field of Classification Search

CPC .................................................. H04M 7/0063
USPC .......................................... 370/352; 208/352
See application file for complete search history.

(56) References Cited

U.S. PATENT DOCUMENTS

| | | | | |
|---|---|---|---|---|
| 7,188,181 | B1 | 3/2007 | Squier et al. | |
| 7,203,720 | B2 | 4/2007 | Smedberg et al. | |
| 7,305,439 | B2 * | 12/2007 | Qian ................. | G06F 17/30873 707/E17.111 |
| 7,373,500 | B2 * | 5/2008 | Ramelson ........... | H04L 63/0428 713/150 |
| 7,779,103 | B1 * | 8/2010 | Fikes .................. | G06F 21/6263 709/219 |
| 8,468,271 | B1 * | 6/2013 | Panwar .............. | G06Q 30/0615 370/469 |

(Continued)

*Primary Examiner* — Parth Patel
(74) *Attorney, Agent, or Firm* — Steptoe & Johnson LLP

(57) ABSTRACT

Various embodiments provide a Peer-to-Peer (P2P, Internet Protocol (IP) telephone system. The telephone system includes a plurality of terminals coupled together via an IP network. The terminals cooperate with one another to provide telephony features without a dedicated central controller such as a PBX and/or a KSU controller. The terminals may further receive requests for configuration data residing on other terminals, relay the requests to such other terminals to obtain the request configuration, and return the requested configuration data to the requesting device.

18 Claims, 4 Drawing Sheets

(56) References Cited

U.S. PATENT DOCUMENTS 8,711,844 B2 * 4/2014 Rose ........................ H04L 12/66 370/352
8,737,384 B2 5/2014 Rose et al.
8,775,551 B2 7/2014 Chen et al.
8,923,278 B2 12/2014 Chitty et al.
2004/0141484 A1 * 7/2004 Rogalski ........... H04L 29/06027 370/338
2005/0240943 A1 * 10/2005 Smith ..................... G06F 9/465 719/328
2006/0007942 A1 * 1/2006 Ogawa .................... H04L 67/16 370/400
2006/0209773 A1 9/2006 Hundal et al.
2007/0123256 A1 * 5/2007 Whitesell .......... H04M 1/72505 455/435.1
2007/0186170 A1 * 8/2007 Carter ............... G06F 17/30905 715/744
2009/0316687 A1 12/2009 Kruppa
2010/0017500 A1 1/2010 Lee
2010/0153568 A1 * 6/2010 Uola ........................ H04L 67/02 709/229
2010/0284396 A1 * 11/2010 Kalmstrom ............. H04L 12/66 370/352
2011/0252151 A1 * 10/2011 Lu ....................... H04W 80/045 709/228

* cited by examiner

PEER-TO-PEER, INTERNET PROTOCOL TELEPHONE SYSTEM WITH PROXY INTERFACE FOR CONFIGURATION DATA

CROSS-REFERENCE TO RELATED APPLICATIONS

This application is a continuation of U.S. patent application Ser. No. 14/251,507, filed Apr. 11, 2014, which is a continuation of U.S. patent application Ser. No. 12/987,860, filed Jan. 10, 2011, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The present disclosure relates to Peer-to-Peer (P2P), Internet Protocol (IP) telephone systems, and more particularly, to proxy interfaces to configuration data in P2P, IP telephone systems.

BACKGROUND

Small enterprise environments typically desire telephone systems that provide a variety of communication features. For example, small enterprise environments typically desire telephones systems that provide internal intercom calls from one telephone terminal to another telephone terminal within the telephone system while still supporting external public switched telephone network (PSTN) calls between a telephone terminal within the system and an external telephone system connected to the PSTN. Other features desired by small enterprise environments may include call conferencing, call transferring, and voice mail functions.

A Peer-to-Peer (P2P), Internet Protocol (IP) telephone system may provide such features. However, such a P2P, IP telephone system may include configuration data that is not entirely known by any one device in the system. Some types of data may be known by all devices, but other types of data may reside on a subset of devices or on only one device. Therein, if a user interface is provided to allow an end-user to make changes to configuration data in such a system, techniques for obtaining data that may be located elsewhere in the system may be required.

SUMMARY

Aspects of the disclosed embodiments are directed to methods, systems, and apparatus, substantially as shown in and/or described in connection with at least one of the figures and as set forth more completely in the claims.

In one embodiment, a telephone terminal for configuring a plurality of telephone terminals of a telephone system. The telephone terminal includes: circuitry configured to conduct a telephone call over an Internet Protocol (IP) network; and a server configured to: display a network-accessible user interface on a client device by transferring aspects of the network-accessible user interface to a web browser of the client device; receive a request for configuration data used to configure one or more telephone terminals of the plurality of telephone terminals; relay the request to a second telephone terminal to obtain the requested configuration data from the second telephone terminal; present the requested configuration data to the client device; establish a first session with the client device and associate a first session cookie with the first session, and establish a second session with the second telephone terminal and associate a second session cookie with the second session; and verify that the request received from the client device includes the first session cookie and replace the first session cookie with the second session cookie.

In another embodiment, a method is disclosed for providing configuration data to a client device via a network-accessible user interface. The method includes: displaying a network-accessible user interface on a client device by transferring aspects of the network-accessible user interface to a web browser of the client device; receiving a request for configuration data used to configure one or more telephone terminals of the plurality of telephone terminals; relaying the request to a second telephone terminal to obtain the requested configuration data from the second telephone terminal; presenting the requested configuration data to the client device; establishing a first session with the client device and associate a first session cookie with the first session, and establishing a second session with the second telephone terminal and associate a second session cookie with the second session; and verifying that the request received from the client device includes the first session cookie and replace the first session cookie with the second session cookie.

These and other advantages, aspects and novel features of the disclosed embodiments, as well as details of illustrative aspects thereof, will be more fully understood from the following description and drawings.

DETAILED DESCRIPTION

Aspects of the disclosed embodiments may be found in a method and apparatus that provide a user interface configured to update configuration data in a peer-to-peer (P2P), Internet Protocol (IP) telephone system. Certain embodiments provide a small enterprise telephone system comprising two or more telephone terminals that coordinate between themselves to implement private branch exchange (PBX) and/or key services unit (KSU) type functionality without the use of a central PBX and/or KSU controller. An Internet Protocol (IP) network is used to support communication and coordination between the telephone terminals. Each telephone terminal supports features and functions that may be offered as resources to the telephone system as a whole and may be shared between the various telephone terminals. One or more of the terminals may provide a network-accessible user interface (UI) that permits a user of the system to change configuration data distributed among various terminals of the system.

Due to its P2P nature, the small enterprise telephone system may be expanded with a high degree of flexibility according to the desires of a small enterprise. In particular, telephone terminals with different features may be added and/or removed from the telephone system in order to provide the small enterprise with a desired feature set. For example, telephone terminals may include but are not limited to (a) telephone terminals with corded handset, keypad and display, (b) telephone terminals with corded handset, keypad, display, and a PSTN telephone jack to support calls using a public switched telephone network (PSTN), (c) basic telephone terminals with corded handset, keypad, display, and a telephone answering device that provide voice mail functions, (d) wireless telephone terminals that connect to the IP network via a wireless IP link, and (e) PSTN gateway terminals with PSTN telephone jacks to support calls using the PSTN.

Figure 1:
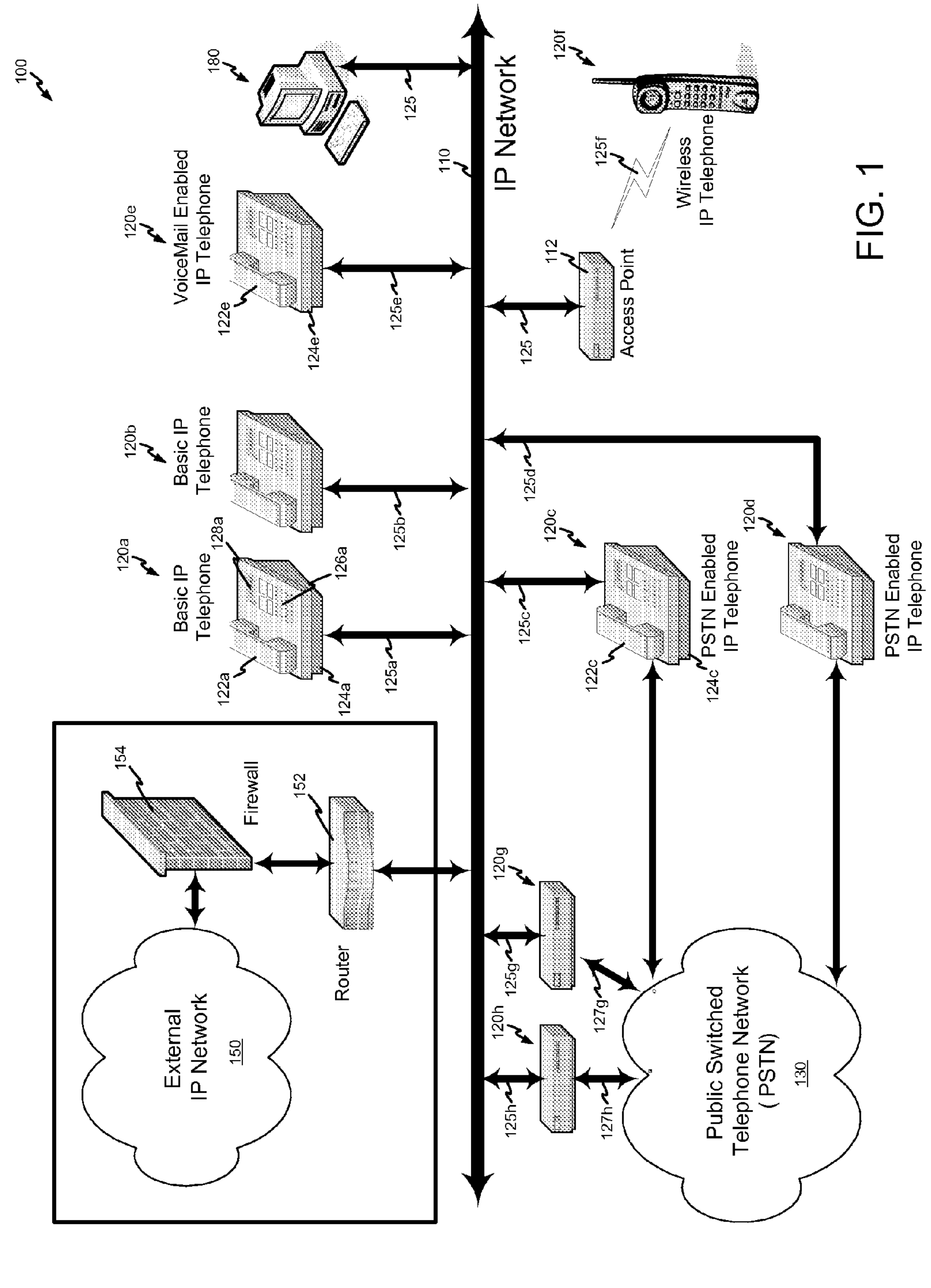
FIG. 1 is a diagram that illustrates a peer-to-peer (P2P), internet protocol (IP) telephone system, in accordance with an embodiment.

Referring now to FIG. 1, a small enterprise telephone system 100 that uses an IP network 110 to support communication between a plurality of telephone terminals 120 (e.g., terminals 120*a-f*) is shown. Unlike conventional Voice over Internet Protocol (VoIP) telecommunications system, the telephone system 100 does not include a central controller node, such as a PBX and/or KSU controller. Rather, control and switching for the telephone system 100 is coordinated among the telephone terminals 120.

As shown, the system 100 uses an IP network 110 to communicatively couple the plurality of telephone terminals 120 to one another. In one embodiment, the IP network 110 is implemented with a fast Ethernet network (e.g., 10/100baseT). However, the IP network 110 may be implemented using other types of IP-based networks such as, for example, wireless 802.11 wireless networks, HomePlug power-line networks, public Internet network, and the like.

FIG. 1 shows different types of telephone terminals 120. In particular, telephone terminals 120*a*, 120*b* are depicted as basic IP telephone terminals coupled to the IP network 110 via wired IP connections 125*a*, 125*b* (e.g., a Cat 5 Ethernet cable). The basic IP telephone terminal 120*a* may include a handset 122*a* and base unit 124*a*, which provide a voice interface and a user interface to the system 100. In particular, the handset 122*a* may be coupled to the base unit 124*a* via a cord (not shown).

The handset 122*a* and base unit 124*a* may each include a microphone and speaker (not shown). As a result, a user may interact with the telephone system 100 via the voice interface provided by the handset 122*a* which receives voice input from a user and outputs audio signals to the user via its microphone and speaker. Alternately, a user may elect to interact with the telephone system 100 via the voice interface provided by the base unit 124*a*, which receives voice input from a user and outputs audio signals to the user via its microphone and speaker when operating in a speakerphone mode of operation.

In addition to the voice interface, the handset 122*a* and the base unit 124*a* may each include a keypad 126*a* and display 128*a* which provide a user interface to the system 100. The keypad 126*a* may permit a user to input digits and/or other information via one or more key presses, and the display 128*a* may provide the user with textual and/or graphical information. Furthermore, the base unit 124*a* may include a network interface configured to transmit and receive IP packets over the IP network 110. The base unit 124*a* may also include circuitry (e.g., processor, microcontroller, data storage devices, and the like), software, and/or firmware configured to conduct a telephone call over the IP network 110.

Besides basic IP terminals 120*a*, 120*b*, the telephone system 100 may further include PSTN enabled IP telephone terminals 120*c*, 120*d* that are coupled to the IP network 110 via wired IP connections 125*c*, 125*d*. In particular, the telephone terminal 120*c* may include a handset 122*c* and base unit 124*c* that provide the telephone terminal 120*c* with functionality similar to that provided by the basic IP telephone terminals 120*a*, 120*b*. However, the handset 122*c* and base unit 124*c* further include a PSTN interface and corresponding circuitry to convert signals between the PSTN 130 and the IP network 110. In particular, the telephone terminals 120*c*, 120*d* include circuitry configured to handle on-hook/off-hook signaling, the detection of incoming PSTN calls, the reception of call ID (CID) signals, the generation of outgoing dialing tones/pulses, and the conversion of voice signals. In one embodiment, the IP telephone functionality of the telephone terminals 120*c*, 120*d* are functionally independent of the PSTN interface functionality, thus permitting simultaneous usage of both the IP telephone functionality and the PSTN interface functionality of the terminals 120*c*, 120*d*.

As shown, the telephone system 100 may further include VoiceMail (VM) enabled IP telephone terminal 120*e* that is coupled to the IP network 110 via a wired IP connection 125*e*. The telephone terminal 120*e* includes a handset 122*e* and base unit 124*e* that provide the telephone terminal 120*e* with functionality similar to that provided by the handset and base unit of the basic IP terminal 120*a*. The base unit 124*e*, however, further includes an integrated telephone answering device, which may provide voicemail features to all of the telephone terminals 120 of the telephone system 100.

The telephone system 100 may also include a wireless IP telephone terminal 120*e* that is coupled to the IP network 110 via a wireless IP connection 125*f* and a wireless access point 112. The wireless IP telephone terminal 120*f* may provide functionality similar to that provided by the basic IP telephone terminals 120*a*, 120*b*. However, unlike the basic IP telephone terminals 120*a*, 120*b*, the wireless IP telephone terminal 120*f* is not tethered to the telephone system 100 by a wired IP connection, thus permitting the user of the wireless IP telephone 120*f* greater mobility.

The telephone system 100 may also include gateway terminals 120*g-h*. Each gateway terminal 120*g-h* may be connected to the IP network 110 via a respective wired connection 125*g-h* and to the PSTN 130 by one or more (e.g., four) wired connections 127*g-h*. Each gateway terminal 120*g-h* in one embodiment operates in a manner similar to the PSTN-enabled, IP telephone terminals 120*c-d* by providing PSTN connectivity to other terminals 120 of the telephone system 100.

The telephone system 100 may further include one or more computing devices 180 such as a laptop computer, desktop computer, workstation, handheld device, and/or other device that may be coupled to the IP network 110. The computing device 180 may include digital circuitry (e.g., processors, memory, and control logic), software and/or firmware, and user interface hardware (e.g., keyboard, mouse, display, and the like) that in combination present a user with a client suitable for interacting with a network-accessible interface of the terminals 120.

Each telephone terminal 120 provides one or more resources that contribute to the entire functionality of the telephone system 100. The PSTN-enabled IP telephone terminal 120c, for example, provides to a user of the telephone terminal 120*c* (a) a user extension resource for voice communication, (b) a user display resource for messaging purposes, and (c) a user keypad resource for user input. Moreover, the PSTN-enabled IP telephone terminal 120*c* provides a PSTN interface resource for not only the PST-enabled IP telephone terminal 120*c* but the other IP telephone terminals 120 of the telephone system 100. Similarly, the VM-enabled telephone terminal 120*d* provides VM functionality not only to the user of the VM-enabled telephone terminal 120*d*, but also to the other IP telephone terminals 120 of the telephone system 100.

The IP telephone terminals 120 described above are not an exhaustive set of the terminals that may be added to the telephone system 100. Other types of P2P terminals are contemplated and may be added to the telephone system 100 in order to expand the overall functionality of the telephone system 100. For example, the telephone system 100 may further include terminals which provide only VoiceMail functionality (e.g., a terminal similar to terminal 120*e*, but without a telephone handset), a video IP phone terminal which supports video IP communication, and other terminal configurations.

As shown, the telephone system 100 may also include an interface between the local IP network 110 and an external IP network 150 (e.g., the Internet). Such an interface may include a router 152 and/or firewall device 154. While not essential for the operation of the telephone system 100, such an external interface supports communication between IP telephone terminals 120 within the telephone system 100 and IP telephone terminals 120 external to the telephone system 100, whether they be at a remote office (acting as an extension to the telephone system 100) or at a third party site (either a VoIP service provider or an IP-based end terminal).

Due to its P2P nature, the telephone system 100 uses various non-conventional techniques to provide operation and features comparable to those available in conventional PBX and/or KSU systems. One such technique relates to discovery of terminals such as IP telephone terminals 120. In response to a terminal 120 being connected to the telephone system 100, the newly-added terminal 120 performs two tasks. First, the new terminal 120 discovers which other terminals 120 are already connected to the telephone system 100, their capabilities (resource set), and their addresses so that the terminal 120 may configure itself for use in the telephone system 100. Second, the newly-added terminal 120 announces its presence on the telephone system 100 to notify existing terminals 120 of its capabilities and address.

In one embodiment, an extension of the DHCP (Dynamic Host Configuration Protocol) is used to implement the discovery process. In such an embodiment, a newly-connected terminal 120 broadcasts on the system 100 a request for DHCP services which typically assigns an IP address to the new terminal 120. In particular, the new terminal 120 may identify itself (e.g., a VoIP terminal) with the DHCP request. Existing terminals 120 of the telephone system 100 may also receive the broadcast DHCP request and response and update their configuration information accordingly so that they may directly communicate with the newly added terminal 120 at the addressed assigned by the DHCP server. Other terminals 120 already on the system 100 also receive the DHCP broadcast. While an extension of the DHCP protocol may be used, other embodiments may implement terminal discovery using another protocol. For example, other embodiments may use other protocols (e.g., the BOOTP protocol, the Web Proxy Autodiscovery (WPAD) protocol, the Zeroconf protocol, the Boot Service Discovery Protocol (BSDP), the Universal Plug and Play (UPnP) set of protocols, and/or a custom protocol).

As an example of a custom protocol, a newly-added terminal 120 may listen for beacon signals on the IP network 110 to determine whether a telephone system 100 is established. In response to a beacon signal, the terminal 120 may request the sender of the beacon signal (e.g., a Master Coordinator as explained in detail below in regard to FIGS. 2-4) to join the telephone system 100. The newly-added terminal 120 may then wait for a beacon signal that indicates system-wide configuration data has been updated. The updated system-wide configuration data may include an extension number for the terminal 120 which advises the newly-added terminal and other terminals 120 in the telephone system 100 of the resources available in the new terminal 120.

Once terminals 120 are aware of other terminals on the system 100, the terminals 120 may configure themselves. For example, a newly-added terminal 120 in the system 100 may be able to detect, for example, that there are other terminals 120 with extension numbers 10, 11 and 12. The newly added terminal 120 may be able to automatically configure itself to be extension number 13, and may then advise the other terminals 120 of its selected extension number. However, if the newly-added terminal 120 had been previously configured with the extension number 14, then the terminal 120 may retain this extension number. Similarly, if this newly-added terminal 120 has PSTN interface, then the existing terminals 120 may re-configure themselves to support use of this newly available PSTN telephone line. Further details regarding updating configuration data which may be used by some embodiments is presented below.

The telephone system 100 in certain embodiments supports resource sharing. As a result of such resource sharing, a small enterprise may continually expand the telephone system 100 by installing new terminals 120. For example, if a user of terminal 120*a* desires to make a PSTN call, the terminal 120 may send a message to terminal 120*c* requesting use of its PSTN interface. Terminal 120*a*, in one embodiment, already knows that terminal 120*c* has a PSTN interface due to the discovery process. If the PSTN interface of terminals 120*c* is not already in use, then terminal 120*c* may assign the PSTN resource to terminal 120*a*. If further requests for the PSTN resource arrive at terminal 120*c* while still being assigned to terminal 120*a*, then terminal 120*c* may deny such additional requests until terminal 120*a* has completed its use of the PSTN resource. Terminal 120*a* may then forward a message to terminal 120*c* which requests terminals 120*c* to dial the appropriate telephone number for a PSTN call on the PSTN network 130 and establish a VoIP connection between the PSTN network 130 and terminal 120*a*.

In some embodiments, terminal 120*c* may still be available for calls on the IP network 110 since the PSTN interface to the PSTN network 130 and VoIP interface to the IP network 110 are implemented as independent resources in some embodiments. Furthermore, if a user at terminal 120*c* wishes to make a PSTN call while its PSTN interface is still assigned to terminal 120*a*, terminal 120*c* may request use of the PSTN interface of terminal 120*d* to facilitate this PSTN call. In this way, any IP telephone terminal 120 in the telephone system 100 has the ability to access any PSTN connection.

Other resources, such as a voice mail system, may be shared among the terminals 120 in a similar fashion. Once a terminal 120 is finished with a resource, a message is sent to the associated terminal 120 indicating the resource may be released and made available for other requests from the telephone system 100. The terminals 120 may also implement a time-out mechanism to ensure the telephone system may recover from error conditions such as a terminal 120 being disconnected from the IP network when in control of a resource of another terminal 120.

The telephone system 100 may further include distributed control aspects. In particular, each of the terminals 120 may include circuitry, software, and/or firmware which determine how to best facilitate a user's request. In a conventional PBX and/or KSU system, a central PBX and/or KSU server controls all resources of the telephone system. In the peer-to-peer telephone system 100, each terminal 120 controls only those resources that are part of its hardware, and loans them to other terminals 120 based on resource requests. The distributed control enables a terminal 120 to resolve conflicts where the terminal 120 may receive simultaneous resource requests, as well as enabling terminals 120 to determine where in the telephone system 100 to seek specific resources.

As mentioned above, the telephone system 100 is a P2P telephone system in which the terminals 120 communicate directly with each other without the coordination efforts of a central controller such as a PBX and/or KSU central controller. For proper operation of the telephone system 100, the terminals 120 include configuration data that is shared among all terminals 120 within the telephone system 100. For example, the configuration data shared among the terminals 120 may include a list of all the telephone terminals 120 and corresponding extension numbers. It is not practical for an end-user to manually update all terminals 120 in the telephone system 100 to contain the same configuration data. Moreover, the telephone system 100 does not contain a dedicated central controller for coordinating the dispersal of such configuration data. Accordingly, each terminal 120 of the telephone system 100 in one embodiment may implement a process that automatically propagates configuration data throughout the P2P, IP telephone system 100.

Despite such propagation of configuration data throughout the telephone system 100, certain configuration data may only be stored in a single terminal 120 or a sub-set of terminals 120 for various reasons. In light of such locally-stored data, a user interface used to configure the telephone system 100 may desire to obtain and/or change such locally-stored configuration data. To this end, one or more of the terminals 120, in one embodiment, are configured to provide a network-accessible UI which a user may access via a network client (e.g., a web browser client) to obtain and/or change such locally-stored configuration data. Accordingly, as shown in FIG. 1, a computing device 180 such as a laptop computer, desktop computer, workstation, handheld device, and/or other web-enabled device may be coupled to the IP network 110 to permit a user of such device 180 to access the network-accessible UI.

Figure 2:
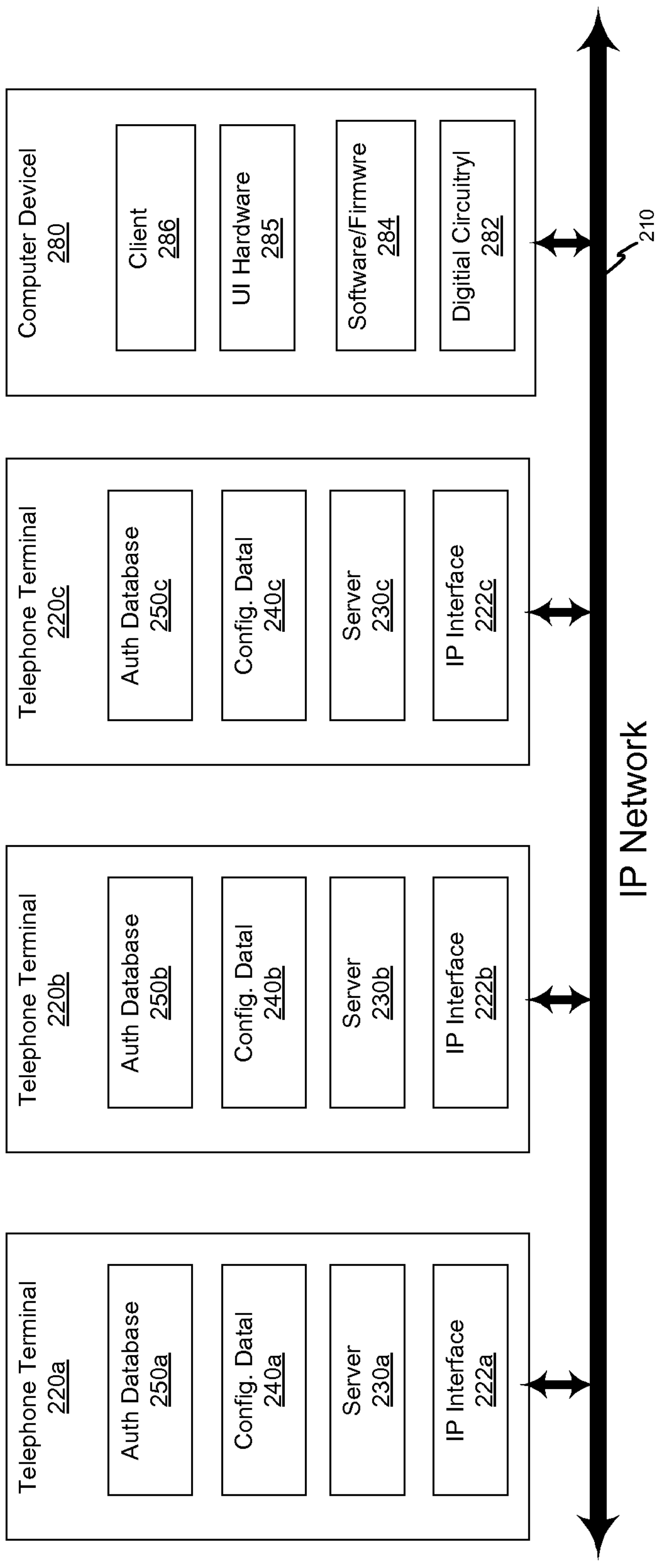
FIG. 2 is a simplified diagram of a P2P, IP telephone system, in accordance with an embodiment.

Referring now to FIG. 2, a simplified diagram of a P2P, IP telephone system 200 is shown which highlights aspects associated with providing a network-accessible UI configured to obtain and/or change configuration data of the telephone system 200. In particular, the telephone system 200 is shown with terminals 220*a-c* coupled to one another via an IP network 210. Moreover, a computing device 280 is also shown coupled to the IP network 210. Each of the 14 terminals 220*a-c* may include an IP interface 222*a* to the IP network 210, a server 230*a-c,* configuration data 240*a-c*, and an authentication database 250*a-c*. In some embodiments, the authentication database 250*a-c* may be implemented as part of the configuration data which the terminals 220*a-c* automatically propagate among the terminals 220*a-c* of the system 200. Moreover, the terminals 220*a-c* may be implemented in a manner similar to any of the terminals described above in regard to FIG. 1.

Each server 230*a-c* may include a hypertext transfer protocol (HTTP) server and associated business logic to provide a network-accessible UI for obtaining and/or changing configuration data in the system 200. To this end, each terminal 220*a-c* may include digital circuitry (e.g., processors, memory, and control logic) as well as software and/or firmware that in combination implement its server 230*a-c* and its business logic associated with the network-accessible UI. While each server 230*a-c*, in one embodiment, may include a HTTP server and associated business logic to provide the network-accessible UI, other embodiments may utilize other data transfer protocols, servers, and/or clients in order to provide the functionality of the network-accessible UI.

The computing device 280 may include digital circuitry 282 (e.g., processors, memory, and control logic), software and/or firmware 284, and user interface hardware 285 (e.g., keyboard, mouse, display, and the like) that in combination present a user with a client 286 suitable for interacting with the network-accessible UI of the servers 230*a-c*. In one embodiment, the client 286 comprises a conventional web browser (e.g., Firefox™, Clirome™, and Internet Explorer™ browsers). However, other embodiments of the computing device 280 may provide a propriety client for accessing the network-accessible UI of the terminals 220*a-c*.

Figure 3:
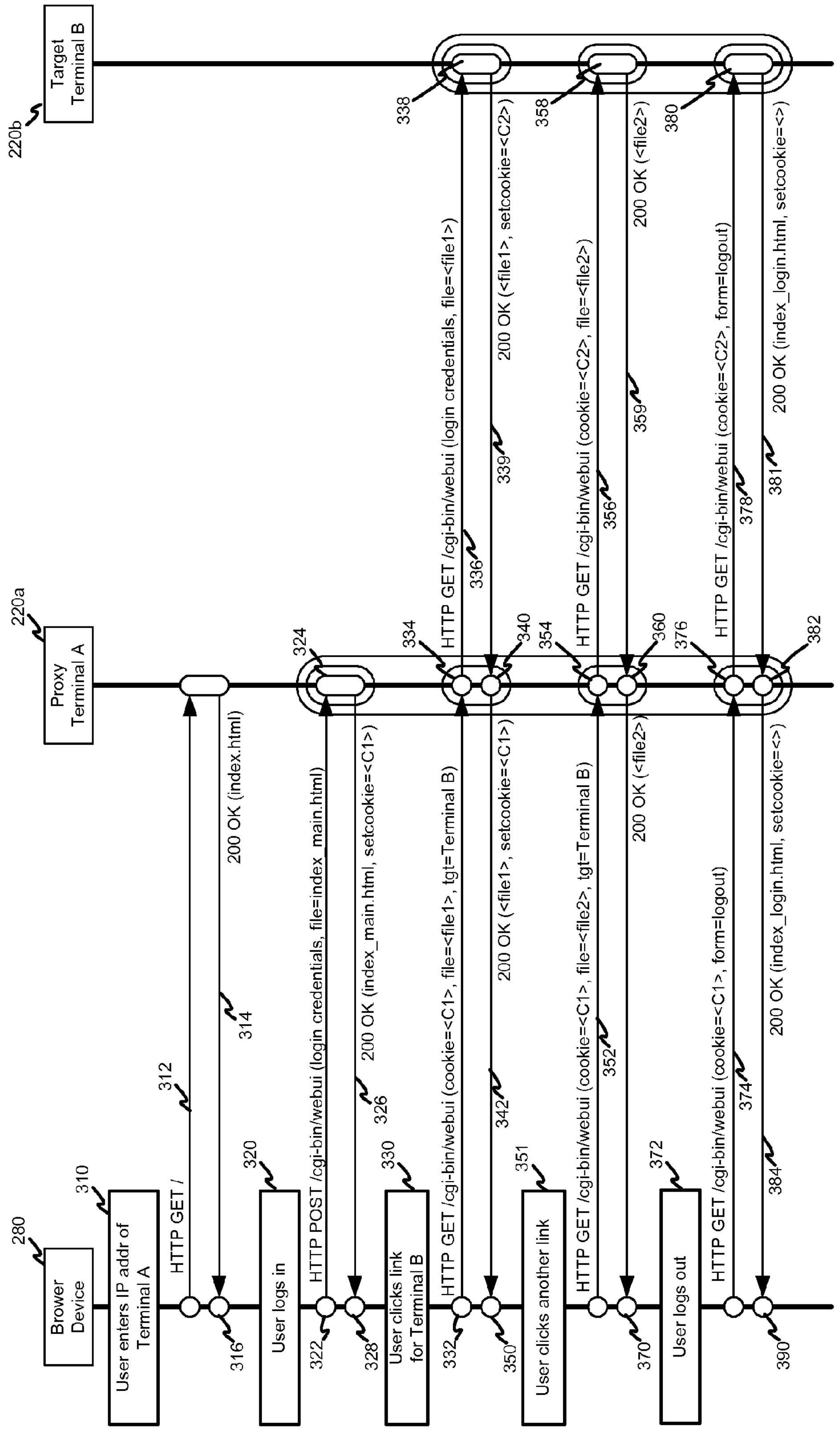
FIG. 3 is a chart showing interaction of a client device with a proxy terminal to obtain configuration data from the target terminal of FIG. 2.

Referring now to FIG. 3, a method for accessing configuration data of a target terminals through a proxy terminal is shown. In the interest of simplifying the description of FIG. 3, the method is described from the standpoint of the computing device 280 accessing configuration data of target terminal 220*b* via a proxy terminal 220*a*. However, in one embodiment, any terminal 220*a-c* may play the role of proxy for another terminal 220*a-c*. For example, the computing device 280, in another embodiment, may access configuration of target terminal 220*c* via proxy terminal 220*b*.

As shown, a user first establishes a session with the proxy terminal 220*a*. To this end, the user at 310 enters the IP address or Universal Resource Location (URL) for the proxy terminal 220*a* via the client 286 of the computing device 280. In response to such input, the computing device 280 at 312 sends an HTTP GET request to the proxy terminal 220*a* for a default page of the proxy terminal 220*a*. In response to such a request, the server 230*a* of the proxy terminal 220*a* at 314 locates and returns the default page (e.g., index.html) which includes a form for entering login credentials of the user. At 316, the client 286 may render the page received from the proxy terminal 220*a* and presents the page including its form for entering login credentials to the user via the user interface hardware 285.

In response to such request for login credentials, the user at 320 may fill in the form for the login credentials (e.g., username and password). At 322, the client 286 may submit the filled-out form to the server 230*a* which causes the login credentials (e.g., username and password) and a requested response page (e.g., index main.html) to be sent via a HTTP POST.

The server 230*a* at 324 may process the credentials received via the HTTP POST to ensure the credentials are valid. In particular, the server 230*a* may reference authentication database 250*a* to ensure the received username and password correspond to a valid and authorized account. The server 230*a* may create an internal web session reference that remains valid for the duration of the user's interaction with the server 230a. In particular, the internal web session reference may remain valid until the user logs out, or until a session timeout terminates the session. To track this session for subsequent requests, the server 230a at 326 may return a session cookie <C1> to the client 286 along with the requested response page (e.g., index_main.html) to be rendered by the client 286. During the remainder of the session, the client 286 may include the session cookie <C1> in all subsequent requests. When receiving subsequent requests, the server 230a may match the received session cookie value to the internal session reference, determine if that session is still valid, and determine whether to process the corresponding request.

At 328, the client 286 may render the page received from the proxy terminal 220a and present the page to the user via the user interface hardware 285. The user at 330 may request configuration data <file1> residing on terminal 220b by, for example, clicking a link in the presented page that corresponds to configuration data <file1>. At 332, the client 286 may send an HTTP GET request to terminal 220a for configuration data <file1> that resides in terminal 220b. In particular, the HTTP GET request may identify the configuration data <file1> and target terminal 220b and provide the session cookie <C1>.

The server 230a of the terminal 220a at 334 may confirm the validity of the session cookie <C1>. Assuming validity of the session cookie <C1>, the server 230a may then establish a separate session between the terminal 220a and the target terminal 220b. In particular, the server 230a at 336 may send to the target terminal 220b an HTTP GET request comprising login credentials (e.g., username and password) and an identifier for the configuration data <file1>. At 338, the server 230b of the target terminal 220b may use its authentication database 250b to confirm the validity of the received login credentials. Assuming the login credentials are valid, the server 230b at 339 may establish the session and return a session cookie <C2>back to the proxy terminal 220a along with the webpage and corresponding configuration data <file1> listed in the initial request.

At 340, the proxy terminal 220a may store the session cookie <C2> within its internal reference data and associate the session cookie <C2> with the session cookie <C1>. At 342, the proxy terminal 220a may attach the configuration data <file1> with the original session cookie <C1>, and pass the configuration data <file1> and session cookie <C1> back to the client 286.

At 350, the client 286 may update the page based upon the configuration data <fuel> received from the target terminal 220b via the proxy terminal 220a, and present the updated page to the user via the user interface hardware 285. The user at 351 may request other configuration data <file2> residing on terminal 220b by, for example, clicking another link in the presented page that corresponds to configuration data <file2>. At 352, the client 286 may send an HTTP GET request to proxy terminal 220a for configuration data <file2> that resides in target terminal 220b. In particular, the HTTP GET request may identify the configuration data <file2> and target terminal 220b and provide the session cookie <C1>.

At 354, the proxy terminal 220a may check and confirm the validity of the session cookie <C1>, determine the session associated with the cookie <C1> is currently involved in a proxy session with target terminal 220b. At 356, the proxy terminal 220a may substitute the session cookie <C2> for proxy terminal 220b and pass the request through to the target terminal 220b for processing. At 358, the target terminal 220b may check and confirm the validity of the session cookie <C2>. After confirming the validity of the session cookie <C2>, the target terminal 220b at 359 may return the webpage and requested configuration data <file2> to the proxy terminal 220a. The proxy terminal 220a at 360 may then return the received webpage and requested data file <file2> to the client 286.

At 370, the client 286 may update the page based upon the configuration data <file2> received from the target terminal 220b via the proxy terminal 220a, and present the updated page to the user via the user interface hardware 285. The user at 372 may logout by, for example, clicking the link in the presented page that corresponds to a logout request. At 374, the client 286 may send to proxy terminal 220a an HTTP GET request that includes the session cookie <C1> and identifies a logout form. At 376, the proxy terminal 220a may check and confirm the validity of the session cookie <C1>, to determine the session associated with the cookie <C1> is currently involved in a proxy session with target terminal 220b. Accordingly, the proxy terminal 220a may substitute the session cookie <C2> for proxy terminal 220b and pass the logout request through to the target terminal 220b at 378.

At 380, the target terminal 220b may check and confirm the validity of the session cookie <C2>. After confirming the validity of the session cookie <C2>, the target terminal 220b may invalidate the session cookie <C2> in its internal reference data, and return a webpage and a blank session cookie to the proxy terminal 220a at 381. The proxy terminal 220a at 382 may then invalidate the session cookie <C1> in its internal reference data, and return the received webpage and blank session cookie to the client 238 at 384. At 390, the client 286 may render the webpage provided by the target terminal 220b via the proxy terminal 220a and invalidate the session cookie <C1>, thus ending its session with the target terminal 220b.

Figure 4:
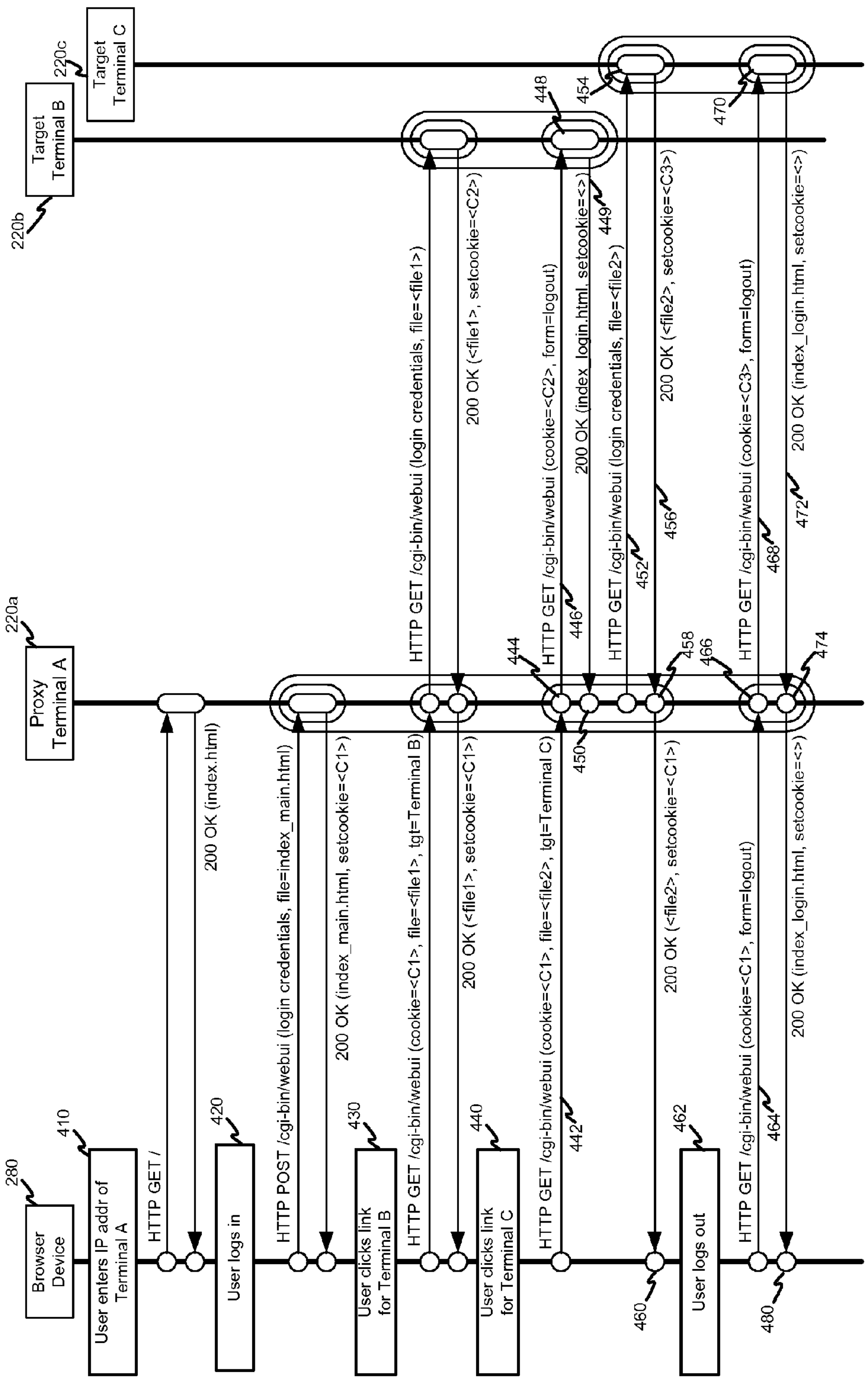
FIG. 4 is a chart showing interaction of a client device with a proxy terminal to obtain configuration data from two separate target terminals of FIG. 2.

Referring now to FIG. 4, a method for accessing configuration data of multiple target terminals through a single proxy terminal is shown. In the interest of simplifying the description of FIG. 4, the method is described from the standpoint of the computing device 280 accessing configuration data of target terminals 220b, 220c via a proxy terminal 220a. However, in one embodiment, any terminal 220a-c may play the role of proxy for another terminal 220a-c. For example, the computing device 280, in another embodiment, may access configuration of target terminals 220a, 220c via proxy terminal 220b.

As shown in FIG. 4, a user at 410 may enter the IP address or URL for the proxy terminal 220a into a client 286 to cause the client to request a default page from the proxy terminal 220a. At 420, the user may log into the proxy terminal 220a by, for example, supplying login credentials via a form of the default page. As a result of logging-in, the client 286 may obtain a session cookie <C1> from the proxy terminal 220a. At 430, the user may request configuration data <file1> from target terminal 220b which causes the proxy terminal 220a to establish a session with the target terminal 220b and obtain a session cookie <C2>. Accordingly, the above aspects of FIG. 4 may be implemented in a manner similar to corresponding aspects of FIG. 3.

However, at 440, a user may request configuration data <file2> residing on terminal 220c by, for example, clicking a link in a page presented by the client 286 that corresponds to configuration data <file2>. At 442, the client 286 may send an HTTP GET request to terminal 220a for configuration data <file2> that resides in terminal 220c. In particular, the HTTP GET request may identify configuration data <file2> and target terminal 220c and may provide the session cookie <C1>.

The server 230a of the terminal 220a at 444 may confirm the validity of the session cookie <C1> and determine that the session cookie <C1> is currently associated with a session with target terminal 220b and not the currently-requested target terminal 220c. The server 230a may then terminate the session with target terminal 220b and establish a session with target terminal 220c. While the following describes terminating the session with target terminal 220b and then establishing the session with target terminal 220c, other embodiments may perform such tasks in reverse order or in parallel.

In particular, the server 230a at 446 may send to target terminal 220b an HTTP GET request that includes the session cookie <C2> and identifies a logout form. At 448, the target terminal 220b may check and confirm the validity of the session cookie <C2>. After confirming the validity of the session cookie <C2>, the target terminal 220b may invalidate the session cookie <C2> in its internal reference data, and return a webpage and a blank session cookie to the proxy terminal 220a at 449. The proxy terminal 220a at 450 may then invalidate the session cookie <C2> in its internal reference data.

The server 230a may then establish a separate session between the terminal 220a and the target terminal 220c. In particular, the server 230a at 452 may send to the target terminal 220c an HTTP GET request comprising login credentials (e.g., username and password) and an identifier for the configuration data <file2>. At 454, the server 230c of the target terminal 220c may use its authentication database 250c to confirm the validity of the received login credentials. Assuming the login credentials are valid, the server 230c at 456 may establish the session and return a session cookie <C3> back to the proxy terminal 220a along with the webpage and corresponding configuration data <file2> listed in the initial request. The proxy terminal 220a at 458 may then return the received webpage and requested data file <file2> to the client 286.

At 460, the client 286 may update the page based upon the configuration data <file2> received from the target terminal 220c via the proxy terminal 220a, and present the updated page to the user via the user interface hardware 285. The user at 462 may then logout by, for example, clicking a link in the presented page that corresponds to a logout request. At 464, the client 286 may send to proxy terminal 220a an HTTP GET request that includes the session cookie <C1> and identifies a logout form. At 466, the proxy terminal 220a may check and confirm the validity of the session cookie <C1>, and determine if the session associated with the cookie <C1> is currently involved in a proxy session with target terminal 220c. Accordingly, the proxy terminal 220a may substitute the session cookie <C3> for proxy terminal 220c and pass the logout request through to the target terminal 220c at 468.

At 470, the target terminal 220c may check and confirm the validity of the session cookie <C3>. After confirming the validity of the session cookie <C3>, the target terminal 220c may invalidate the session cookie <C3> in its internal reference data, and return a webpage and a blank session cookie to the proxy terminal 220a at 472. The proxy terminal 220a at 474 may then invalidate the session cookie <C1> in its internal reference data, and return the received webpage and blank session cookie to the client 238. At 480, the client 286 may render the webpage provided by the target terminal 220b via the proxy terminal 220a and invalidate the session cookie <C1>, thus ending its session with the proxy terminal 220a.

The above-described proxy approach of an IP telephone terminal may permit another IP telephone terminal to access data of IP telephone terminals that reside behind a NAT router/firewall, wherein such data would not otherwise be accessible. Merely redirecting an IP telephone terminal to another IP telephone terminal for data may result in the IP telephone terminal attempting to access data of an IP telephone terminal residing behind a NAT router/firewall without a publicly-accessible address. In such a situation, the request for data would fail due to the intervening NAT router/firewall and no public interface. However, if an IP telephone terminal having the above proxy features is implemented behind the NAT router/firewall with a publicly accessible address, then the IP telephone terminal may fulfill the requests for data and thereby make such data behind the NAT router/firewall accessible.

Various embodiments are described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible computer readable medium such as, for example, flash memory devices, hard disk devices, compact disc media, DVD media, EEPROMs, and the like. Such instruction when executed by a telephone terminal or other device, may configure the telephone terminal or other device to perform tasks associated with receiving requests for configuration data residing on other telephone terminals and acting as a proxy for such requests for configuration data.

One skilled in the art would readily appreciate that many modifications and variations of the disclosed embodiments are possible in light of the above teachings. Thus, it is to be understood that, within the scope of the appended claims, aspects of the disclosed embodiments may be practiced in a manner other than as described above.

What is claimed:

1. A telephone terminal for configuring a plurality of telephone terminals of a telephone system, the telephone terminal comprising:

circuitry configured to conduct a telephone call over an Internet Protocol (IP) network; and a server configured to:

display a network-accessible user interface on a client device by transferring aspects of the network-accessible user interface to a web browser of the client device;

receive a request for configuration data used to configure one or more telephone terminals of the plurality of telephone terminals;

relay the request to a second telephone terminal to obtain the requested configuration data from the second telephone terminal;

present the requested configuration data to the client device;

establish a first session with the client device and associate a first session cookie with the first session, and establish a second session with the second telephone terminal and associate a second session cookie with the second session; and verify that the request received from the client device includes the first session cookie and replace the first session cookie with the second session cookie.

2. The telephone terminal of claim 1, wherein the server comprises a hypertext transport protocol (HTTP) server configured to present the network-accessible user interface to the client device.

3. The telephone terminal of claim 1, wherein the server is configured to determine whether the client device has provided valid login credentials prior to returning the requested configuration data to the client device.

4. The telephone terminal of claim 1, wherein the server is further configured to permit a user of the client device, via the network-accessible user interface displayed by the web browser, to change to the configuration data used to configure the one or more telephone terminals.

5. The telephone terminal of claim 1, wherein the server is further configured to:

receive, from the client device via the IP network and the network-accessible user interface displayed by the web browser, another request for configuration data used to configure one or more telephone terminals of the plurality of telephone terminals;

determine that the another request for configuration data corresponds to further configuration data residing on a third telephone terminal;

relay the another request to the third telephone terminal to obtain the requested further configuration data from the third telephone terminal; and update the network-accessible user interface displayed by the web browser to present the requested further configuration data from the third telephone terminal to the client device via the network-accessible user interface.

6. The telephone terminal of claim 1, wherein the server is configured to terminate a session with the other IP telephone terminal and establish a session with the third telephone terminal in response to the request for configuration data residing on the third telephone terminal.

7. A method for providing configuration data to a client device via a network-accessible user interface, the method comprising:

displaying a network-accessible user interface on a client device by transferring aspects of the network-accessible user interface to a web browser of the client device;

receiving a request for configuration data used to configure one or more telephone terminals of the plurality of telephone terminals;

relaying the request to a second telephone terminal to obtain the requested configuration data from the second telephone terminal;

presenting the requested configuration data to the client device;

establishing a first session with the client device and associate a first session cookie with the first session, and establishing a second session with the second telephone terminal and associate a second session cookie with the second session; and verifying that the request received from the client device includes the first session cookie and replace the first session cookie with the second session cookie.

8. The method of claim 7, further comprising determining with the first telephone terminal whether the client device has provided valid login credentials prior to returning the requested configuration data to the client device.

9. The method of claim 7, wherein:

the second telephone terminal stores a file that includes the configuration data; and the method further comprises receiving, with the first telephone terminal, the file from the second telephone terminal in response to said relaying.

10. The method of claim 7, further comprising permitting a user of the client device to change, via the network-accessible user interface displayed by the web browser, the configuration data used to configure the plurality of telephone terminals.

11. The method of claim 7, further comprising:

receiving, from the client device via the IP network the network-accessible user interface of the first telephone terminal, another request for configuration data used to configure one or more telephone terminals of the plurality of telephone terminals;

determining that the another request for configuration data corresponds to further configuration data residing on a third telephone terminal;

relaying the another request to the third telephone terminal to obtain the requested further configuration data from the third telephone terminal; and updating the network-accessible user interface displayed by the web browser to present the requested further configuration data from the third telephone terminal to the client device via the network-accessible user interface of the first telephone terminal.

12. The method of claim 7, further comprising, in response to the request for configuration data residing on the third telephone terminal:

terminating a session between the first telephone terminal and the second IP telephone terminal; and establish a session between the first telephone terminal and the third IP telephone terminal.

13. A non-transitory computer readable medium comprising a plurality of instructions, that in response to being executed, configure an Internet Protocol (IP) telephone terminal to:

display a network-accessible user interface on a client device by transferring aspects of the network-accessible user interface to a web browser of the client device;

receive a request for configuration data used to configure one or more telephone terminals of the plurality of telephone terminals;

relay the request to a second telephone terminal to obtain the requested configuration data from the second telephone terminal;

present the requested configuration data to the client device;

establish a first session with the client device and associate a first session cookie with the first session, and establish a second session with the second telephone terminal and associate a second session cookie with the second session; and verify that the request received from the client device includes the first session cookie and replace the first session cookie with the second session cookie.

14. The non-transitory computer readable medium of claim 13, wherein the plurality of instructions further configure the IP telephone terminal to:

determine with the first telephone terminal whether the client device has provided valid login credentials prior to returning the requested configuration data to the client device.

15. The non-transitory computer readable medium of claim 13, wherein the plurality of instructions further configure the IP telephone terminal to:

store a file that includes the configuration data; and receive with the first telephone terminal, the file from the second telephone terminal in response to the relay of the request to the another IP telephone terminal.

16. The non-transitory computer readable medium of claim 13, wherein the plurality of instructions further configure the IP telephone terminal to:

permit a user of the client device to change, via the network-accessible user interface displayed by the web browser, the configuration data used to configure the plurality of telephone terminals.

17. The non-transitory computer readable medium of claim 13, wherein the plurality of instructions further configure the IP telephone terminal to:

receive, from the client device via the IP network and the network-accessible user interface, another request for configuration data used to one or more IP telephone terminals of the telephone system;

determine that the another request for configuration data corresponds to further configuration data residing on a third telephone terminal;

terminate a session with the another IP telephone terminal;

establish a session with the third IP telephone terminal;

relay the another request to the third IP telephone terminal to obtain the requested further configuration data from the third IP telephone terminal; and update the network-accessible user interface displayed by the web browser to present the requested further configuration data from the third IP telephone terminal to the client device via the network-accessible user interface.

18. The non-transitory computer readable medium of claim 13, wherein the plurality of instructions further configure the IP telephone terminal to:

terminate a session between the first telephone terminal and the second IP telephone terminal; and establish a session between the first telephone terminal and the third IP telephone terminal.

* * * * *